(12) United States Patent
Cheng et al.

(10) Patent No.: US 7,415,446 B2  
(45) Date of Patent: Aug. 19, 2008

(54) MODEL-FREE ADAPTIVE (MFA) OPTIMIZATION

(75) Inventors: George Shu-Xing Cheng, Folsom, CA (US); Steven L. Mulkey, Cameron Park, CA (US)

(73) Assignee: General Cybernation Group, Inc., Rancho Cordova, CA (US)

( * ) Notice: Subject to any disclaimer, the term of this patent is extended or adjusted under 35 U.S.C. 154(b) by 432 days.

(21) Appl. No.: 10/969,485

(22) Filed: Oct. 19, 2004

(65) Prior Publication Data

US 2005/0086202 A1    Apr. 21, 2005

(51) Int. Cl.  
*G06N 5/00* (2006.01)

(52) U.S. Cl. .......................... 706/23; 706/45

(58) Field of Classification Search ........... 706/23, 706/15, 45, 22, 25; 360/75  
See application file for complete search history.

(56) References Cited

U.S. PATENT DOCUMENTS

| | | | | |
|---|---|---|---|---|
| 5,486,996 | A * | 1/1996 | Samad et al. | 700/32 |
| 5,649,065 | A * | 7/1997 | Lo et al. | 706/22 |
| 5,704,200 | A * | 1/1998 | Chmielewski et al. | 56/10.2 E |
| 5,987,444 | A * | 11/1999 | Lo | 706/25 |
| 6,046,878 | A * | 4/2000 | Liu et al. | 360/75 |
| 6,055,524 | A | 4/2000 | Cheng | |
| 6,360,131 | B1 | 3/2002 | Cheng | |
| 6,556,980 | B1 | 4/2003 | Cheng | |
| 6,684,112 | B1 | 1/2004 | Cheng | |
| 6,684,115 | B1 | 1/2004 | Cheng | |
| 7,158,840 | B2 * | 1/2007 | Jacques | 700/28 |
| 2005/0004687 | A1 | 1/2005 | Cheng | |
| 2005/0038532 | A1 | 2/2005 | Cheng et al. | |

OTHER PUBLICATIONS

USPTO Filing Receipt mailed Jul. 3, 2003, Specification and Drawings of U.S. Appl. No. 60/474,688, filed on May 30, 2003, applicant: George Shu-Xing Cheng.  
USPTO Filing Receipt mailed Nov. 5, 2003, Specification and Drawings of U.S. Appl. No. 60/494,488, filed on Aug. 12, 2003, applicant: George Shu-Xing Cheng.  
USPTO Filing Receipt mailed Dec. 12, 2003, Specification and Drawings of U.S. Appl. No. 60/513,126, filed on Oct. 20, 2003, applicants: George Shu-Xing Cheng and Steven L. Mulkey.

* cited by examiner

*Primary Examiner*—Wilbert L Starks, Jr.  
(74) *Attorney, Agent, or Firm*—Peter R. Leal, Esq.; DLA Piper US LLP

(57) ABSTRACT

An apparatus and method is disclosed for solving optimization problems without the need to build mathematical models or rules. The inventive method combines the structure of a single-loop feedback control system and optimization search engine mechanisms. Running in real-time, a Model-Free Adaptive (MFA) optimizer can automatically search for the optimal operating point for a dynamic system when a parabolic relationship exists between the input and output. The MFA optimizer comprises a user-selected Min/Max setter to define the searching objective, a process acting-mode search engine to determine if the process is running in direct-acting or reverse-acting mode, a maximum search engine and a minimum search engine to find the maximum or minimum. This apparatus and method is useful in fuel-and-air ratio optimization for combustion processes, yield optimization for chemical or biological reactors, and operating efficiency optimization for coal or ore ball mills.

37 Claims, 5 Drawing Sheets

MODEL-FREE ADAPTIVE (MFA) OPTIMIZATION

The subject of this patent relates to optimization of systems including industrial processes, equipment, facilities, buildings, homes, devices, engines, robots, vehicles, aircraft, space-vehicles, appliances and other systems, and more particularly to a method and apparatus for automatically optimizing a process or system based on the optimal objectives without using mathematical models of the process or system.

In the U.S. Pat. Nos. 6,055,524, 6,556,980 B1, and 6,360,131 B1, Model-Free Adaptive (MFA) control technology was introduced. In this patent, we expand the Model-Free Adaptive method from automatic control to automatic optimization.

Optimization has four key elements: (1) Objectives—the objectives that define what to achieve; (2) Conditions and Constraints—the conditions and constraints that may not allow the achievement of some of the objectives; (3) Acceptable Solutions—all possible solutions that allow the achievement of some or all of the objectives; and (4) Optimal Solution—the solution that makes the most sense after the tradeoff between the conflicts in objectives and constraints.

Optimization problems can be difficult to solve due to the following reasons: (1) the process input-output relationship is typically dynamic, multivariable, nonlinear, and time-varying; (2) there are multiple operating conditions and constraints; (3) the process signals are frequently contaminated by noises and disturbances; (4) online optimization is required; and most importantly, (5) it is difficult to develop and maintain a process model or a set of rules.

Traditional optimization is dependent on the first-principle or identification based mathematical models or rules. The Model-Free Adaptive Optimization technology can solve many optimization problems without the need to build such models or rules. Running in real-time, the MFA optimizer can automatically search for the optimal operating point for a dynamic system when a parabolic relationship exists between the input and output. The MFA optimization technology is useful in fuel-and-air ratio optimization for combustion processes, yield optimization for chemical or biological reactors, and operating efficiency optimization for coal or ore ball mills.

The term "mechanism" is used herein to represent hardware, software, or any combination thereof. The term "process" is used herein to represent a physical system or process with inputs and outputs that have dynamic relationships.

DESCRIPTION

A. SISO Model-Free Adaptive (MFA) Optimizer

Figure 1:
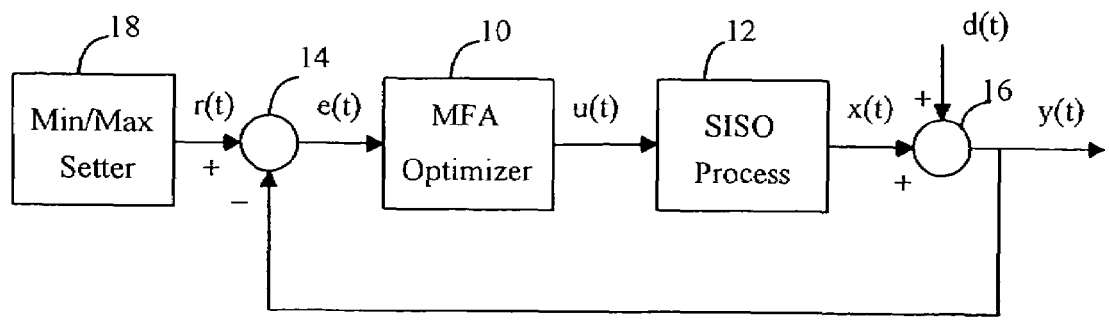
FIG. 1 is a block diagram illustrating a single-input-single-output (SISO) Model-Free Adaptive (MFA) optimization system where an MFA optimizer optimizes a single-input-single-output (SISO) process.

FIG. 1 illustrates a single-input-single-output (SISO) Model-Free Adaptive (MFA) optimization system. It comprises a SISO MFA optimizer 10, a SISO process 12, signal adders 14, 16, and a Min/Max Setter 18. The signals shown in FIG. 1 are as follows:

$r(t)$—Setpoint.
$y(t)$—Measured Process Variable, $y(t)=x(t)+d(t)$.
$x(t)$—Process Output.
$u(t)$—Optimizer Output that is applied to the Process Input.
$d(t)$—Disturbance, the disturbance caused by noise or load changes.
$e(t)$—Error between the Setpoint and Measured Variable, $e(t)=r(t)-y(t)$.

Assume that there is an optimal point in the process input-output relationship, and assume that we can manipulate the process input within its range to allow the process output to reach the optimal point, where the process input range may be bounded by limits or constraints.

The optimization objective is for the SISO MFA optimizer to produce an output $u(t)$ to force the measured process variable $y(t)$ to reach the optimal point and stay near there under variations in process dynamics, disturbances, noises, and other uncertainties.

Unlike any other traditional optimization system, the SISO MFA optimization system uses the same structure as a SISO feedback control system. It makes the implementation and use of such a system easy and user-friendly. The SISO MFA optimizer can be implemented in the same environment as SISO feedback controllers including but not limited to PID (proportional-integral-derivative) controllers and SISO MFA controllers. On the other hand, since the SISO feedback control systems are the most popular control systems and most control engineers and process operators are familiar with the structure and variables, the SISO MFA optimizers are easy to learn, use, and maintain.

The Min/Max Selector 18 allows the user to choose when to use the optimizer to find a minimum or a maximum. Depending on the information, the MFA Optimizer can move the setpoint to its low limit or high limit accordingly. As an example, consider a system where the setpoint and the process variable have a range of 0% to 100%. The low setpoint limit is 5% and the high setpoint limit is 95%. If the Min/Max Selector is set to search for a minimum, setpoint $r(t)$ can be set to 5%. Similarly, if the Min/Max Selector is set to search for a maximum, setpoint $r(t)$ can be set to 95%.

As another example, consider a system where the setpoint and process variable have a range of 150 degrees Fahrenheit to 650 degrees Fahrenheit. The low setpoint limit is at 200 degrees Fahrenheit and the high setpoint limit is at 600 degrees Fahrenheit. If the Min/Max Selector is set to search for a minimum, setpoint $r(t)$ can be set to 200 degree F.; and if the Min/Max Selector is set to search for a maximum, setpoint $r(t)$ can be set to 600 degree F. This setpoint setting arrangement allows the MFA optimizer to produce an error $e(t)$ so that it will continuously search for the optimal point towards the right direction. This is because the search will not stop unless the process variable $y(t)$ reaches the setpoint $r(t)$ or an optimal point.

The algorithm for producing the output $u(t)$ for the MFA optimizer will be discussed in the final portion of the description.

Figure 2:
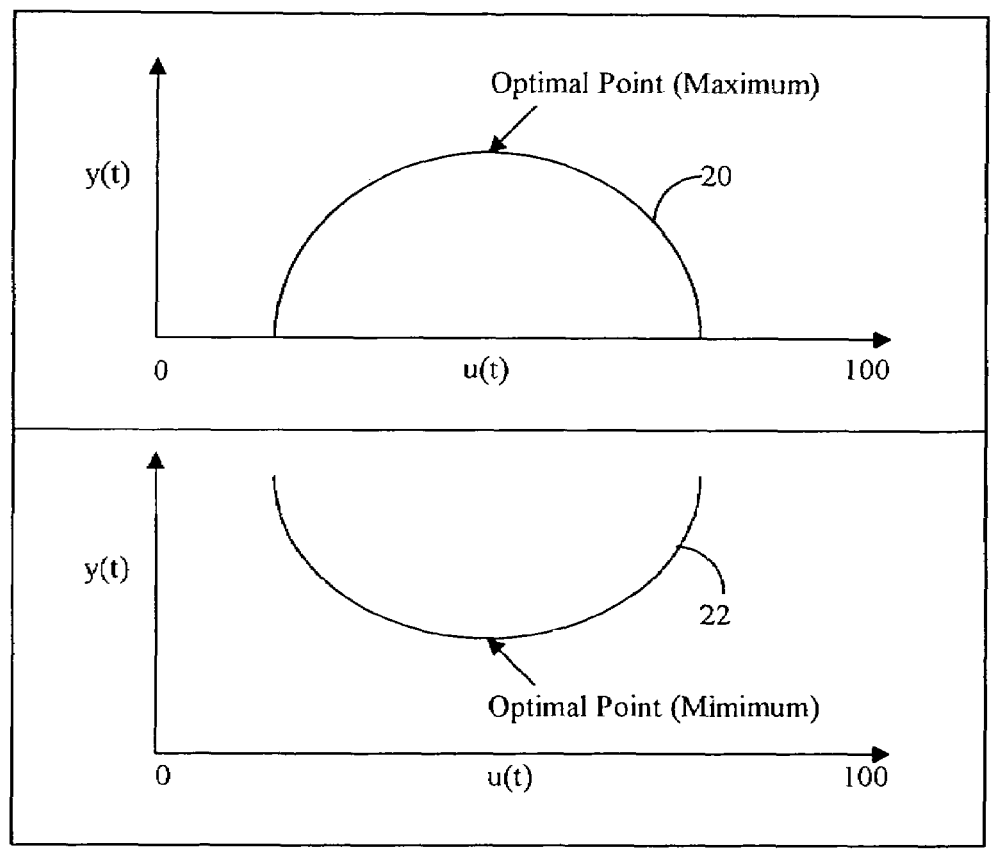
FIG. 2 is a drawing illustrating the process input-output relationship, where there is either a maximum or minimum as an optimal point.

FIG. 2 is a drawing illustrating the process input-output relationship, where there is a maximum or minimum as an optimal point. Curve 20 of the top chart shows that when u(t) starts to increase from 0, y(t) increases. This relationship continues until y(t) reaches a maximum and then it starts to decrease. This type of process can be either direct-acting or reverse-acting depending on the operating point. From a control point of view, the process is not controllable when using regular feedback controllers. Since the process changes its sign, it will cause a negative feedback loop to become a positive feedback loop. An automatic control system is based on negative feedback in order to be closed-loop stable.

In contrast, from an optimization point of view, this process can be optimized since there exists an optimal point that can be reached. If a process is only direct-acting or reverse-acting, there will be no optimal point to reach. Then, the process may be controllable but cannot be optimized since no maximum or minimum exists.

Curve 22 of the bottom chart shows that when u(t) starts to increase from 0, y(t) decreases and the relationship continues until y(t) reaches a minimum and then it starts to increase. Similarly, this process changes its sign and cannot be controlled by conventional feedback controllers but can be optimized since there exists a minimum as an optimal point.

Figure 3:
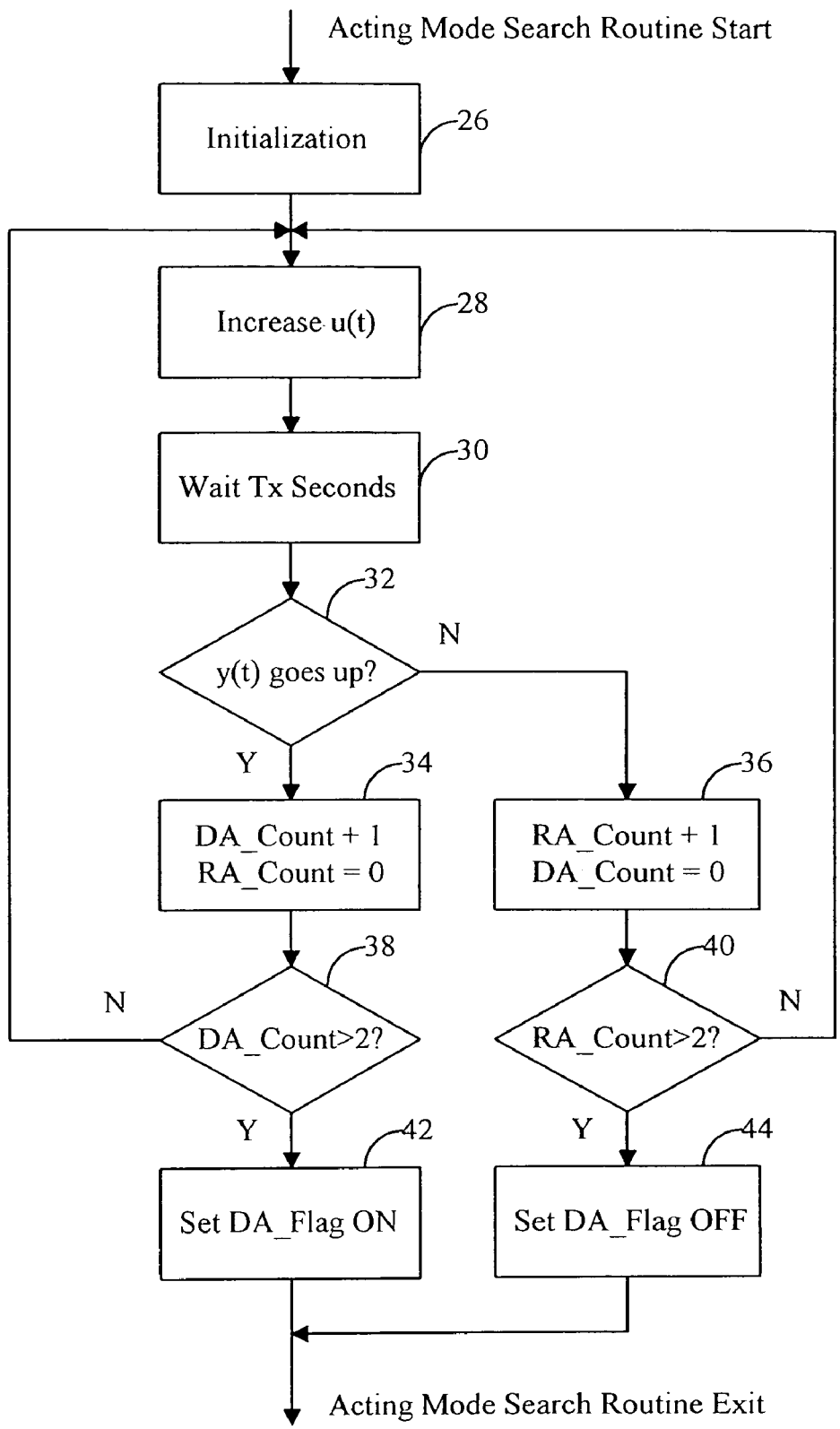
FIG. 3 is a flow chart describing the steps in a process acting mode search engine mechanism in an MFA optimizer.

FIG. 3 is a flow chart describing the steps in a process acting mode search engine mechanism in an MFA optimizer. It describes the method for detecting whether the process is in a direct-acting mode or reverse-acting mode. At Block 26, initialization is taking place including the tasks to clear the direct-acting counter (Let DA_Count=0), clear the reverse-acting counter (Let RA_Count=0), and set the direct-acting flag to its default value (Let DA_Flag=ON). These counters and the flag are variables in the acting mode search engine mechanism. At Block 28, the optimizer output is increased by $\Delta u(t)$, and at Block 30, it waits for a period of time, Tx. This is the estimated delay time between the process input and output, which is user-configurable.

At Block 32, the routine checks the measured process variable y(t) to see if its value has increased in comparison to its previous values. If the answer is Yes, the routine goes to Block 34 to increase the direct-acting counter by 1 and clear the reverse-acting counter. If the answer is No, the routine goes to Block 36 to increase the reverse-acting counter by 1 and clear the direct-acting counter. These counters are used to record the number of times the acting type has been detected.

At Block 38, DA_Count value is checked. If it is larger than 2, it means that the process has been detected in the direct-acting mode in the past 3 consecutive tries. The routine will move to Block 42 to set the DA_Flag to ON and exit. Notice that the number of tries required to guarantee the detection of the acting mode may depend on the process and is user configurable. Here, we use 3 tries as an example. This applies to all the counters used in the search engines in this patent.

If the DA_Count value is not larger than 2, the routine goes back to Block 28 to perform one more round of detection. If the routine is branched to Block 36, it will continue to Block 40 to check the RA_Count. Similarly, if its value is larger than 2, it means that the process has been detected in the reverse-acting mode in the past 3 consecutive tries. The routine will move to Block 44 to set the DA_Flag to OFF to indicate that the process is in the reverse-acting mode and then exit. If the RA_Count value is not larger than 2, the routine goes back to Block 28 to perform one more round of detection.

Notice that the y(t) signal might be contaminated with noise. It is necessary to use filters such as low pass filters to remove high frequency noises before applying this routine and other search engine routines in this patent.

Figure 4:
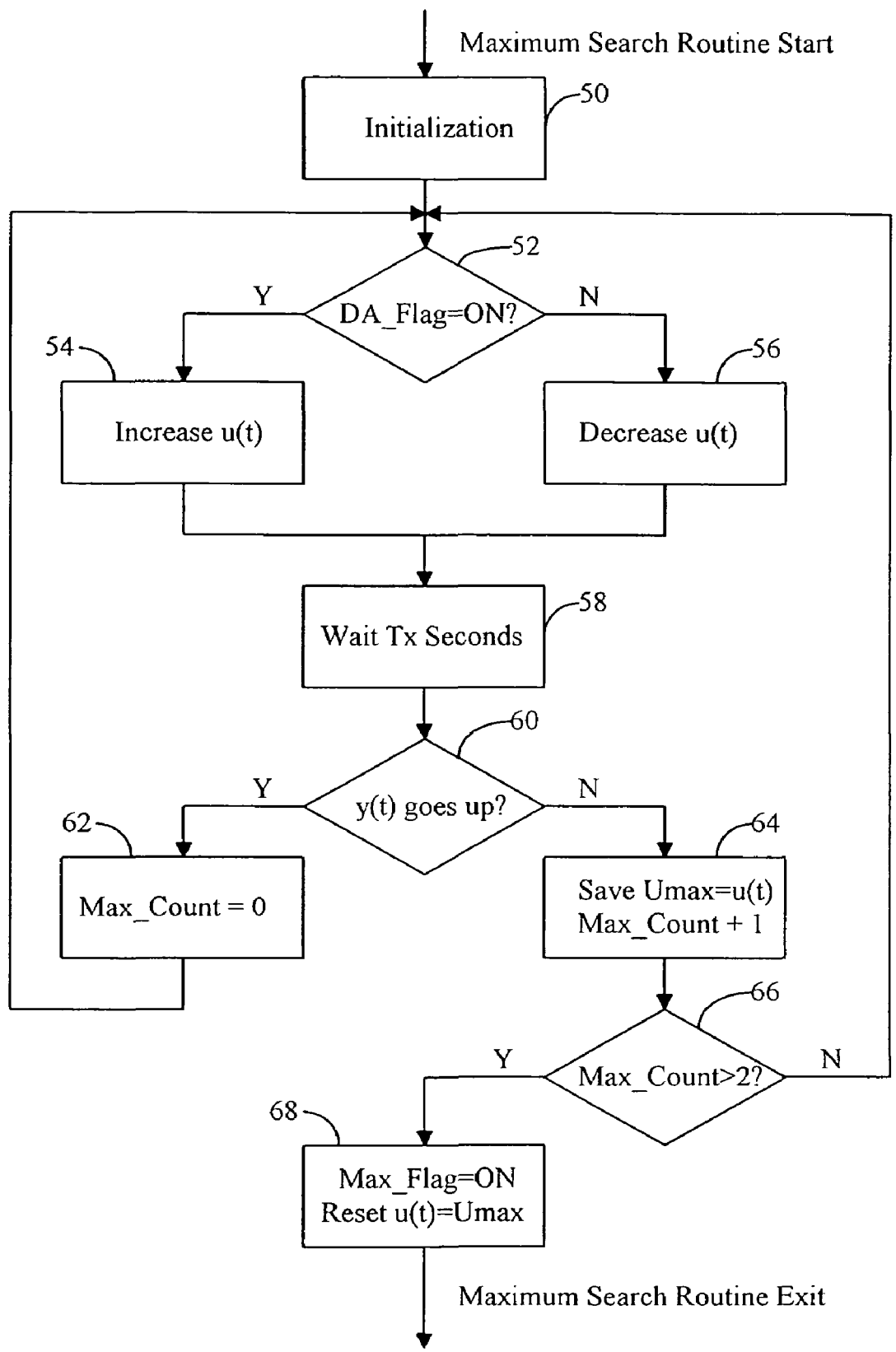
FIG. 4 is a flow chart describing the steps in a maximum search engine mechanism in an MFA optimizer.

FIG. 4 is a flow chart describing the steps in a maximum search engine mechanism in an MFA optimizer. At Block 50, initialization is taking place including the tasks to clear the maximum counter (Max_Count) and maximum flag (Max_Flag). The counter and flag are variables in the maximum search engine mechanism. At Block 52, the routine checks the process acting mode. If it is in the direct-acting mode, optimizer output u(t) is increased by $\Delta u(t)$ at Block 54. If it is in the reverse-acting mode, optimizer output u(t) is decreased by $\Delta u(t)$ at Block 56. Notice that $\Delta u(t)$ can be a varying value or a fixed value depending on the design of the MFA optimizer, which will be discussed in detail. This applies to all the $\Delta u(t)$ value presented in this patent.

At Block 58, the routine waits for a period of time Tx. This is the estimated delay time between the process input and output, which is user-configurable. At Block 60, the routine checks the measured process variable y(t) to see if its value is increased compared to previous values. If the answer is Yes, the routine goes to Block 62 to clear the Max_Count since it has not yet reached the maximum. The routine goes back to Block 52 to continue the search.

If the answer at Block 60 is No, it means that y(t) was going up but now it is starting to decrease. It is a good indication that the maximum has been reached. At Block 64, the current u(t) is saved as Umax, which is the optimizer output that produced maximum y(t). This step needs to be done only one time when Max_Count is equal to 0. Then the Max_Count is incremented by 1.

At Block 66, Max_Count value is checked. If it is larger than 2, it means that y(t) has been declining for the past 3 consecutive tries and it is certain that y(t) has passed its maximum. At Block 68, the Max_Flag is set to ON to indicate the detection of maximum. Notice that the number of tries required to guarantee the detection of the maximum may depend on the process and is user configurable. Here, we use 3 tries as an example.

It is a good idea to reset the u(t) to the saved Umax to allow y(t) to get back to its maximum. If the value of Max_Count is not larger than 2, the routine will go back to Block 52 to continue the search.

Figure 5:
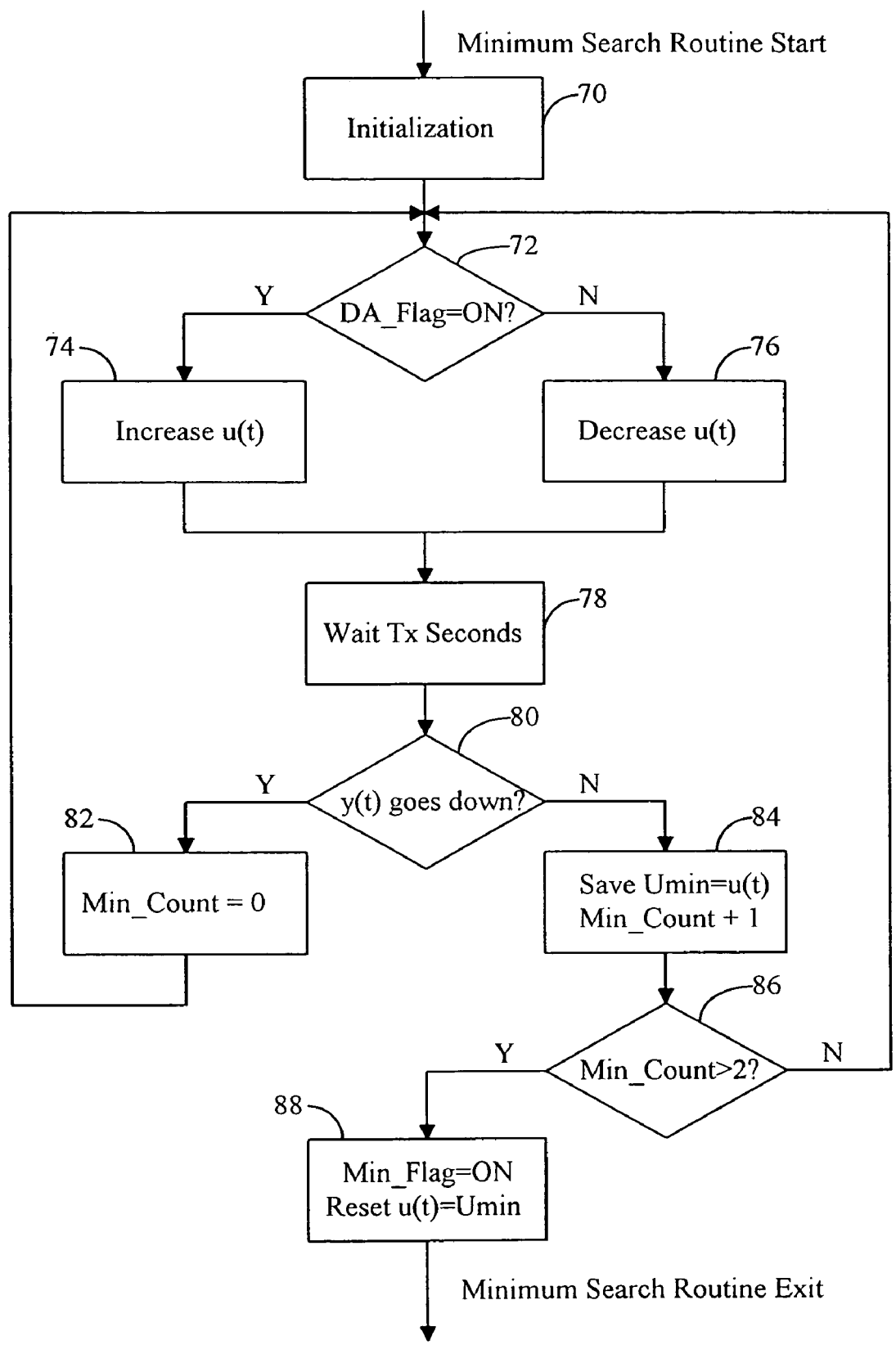
FIG. 5 is a flow chart describing the steps in a minimum search engine mechanism in an MFA optimizer.

FIG. 5 is a flow chart describing the steps in a minimum search engine mechanism in an MFA optimizer. At Block 70, initialization is taking place including the tasks to clear the minimum counter (Min_Count) and minimum flag (Min_Flag). The counter and flag are variables in the minimum search engine mechanism. At Block 72, the routine checks the process acting mode. If it is in the direct-acting mode, optimizer output u(t) is increased by $\Delta u(t)$ at Block 74. If it is in the reverse-acting mode, optimizer output u(t) is decreased by $\Delta u(t)$ at Block 76. At Block 78, the routine waits for a period of time Tx. This is the estimated delay time between the process input and output, which is user-configurable.

At Block 80, the routine checks the measured process variable y(t) to see if its value has decreased in comparison to its previous values. If the answer is Yes, the routine goes to Block 82 to clear the Min_Count since it has not yet reached the minimum. The routine goes back to Block 72 to continue the search. If the answer at Block 80 is No, it means that y(t) was declining but now it is increasing. This is a good indication that the minimum has been reached. At Block 84, the current u(t) is saved as Umin, which is the optimizer output that produced minimum y(t). This step needs to be done only one time when Min _Count is equal to 0. Then the Min _ Count is incremented by 1.

At Block 86, Min_Count value is checked. If it is larger than 2, it means that y(t) has been rising for the past 3 consecutive tries and it is certain that y(t) has passed its minimum. Notice that the number of tries required to guarantee the detection of the minimum may depend on the process and is user configurable. Here, we use 3 tries as an example. At Block 88, the Min_Flag is set to ON to indicate the detection of the minimum. It is a good idea to reset the u(t) to the saved Umin to allow y(t) to go back to its minimum. If the value of Min_Count is not larger than 2, the routine will go back to Block 72 to continue the search.

Figure 6:
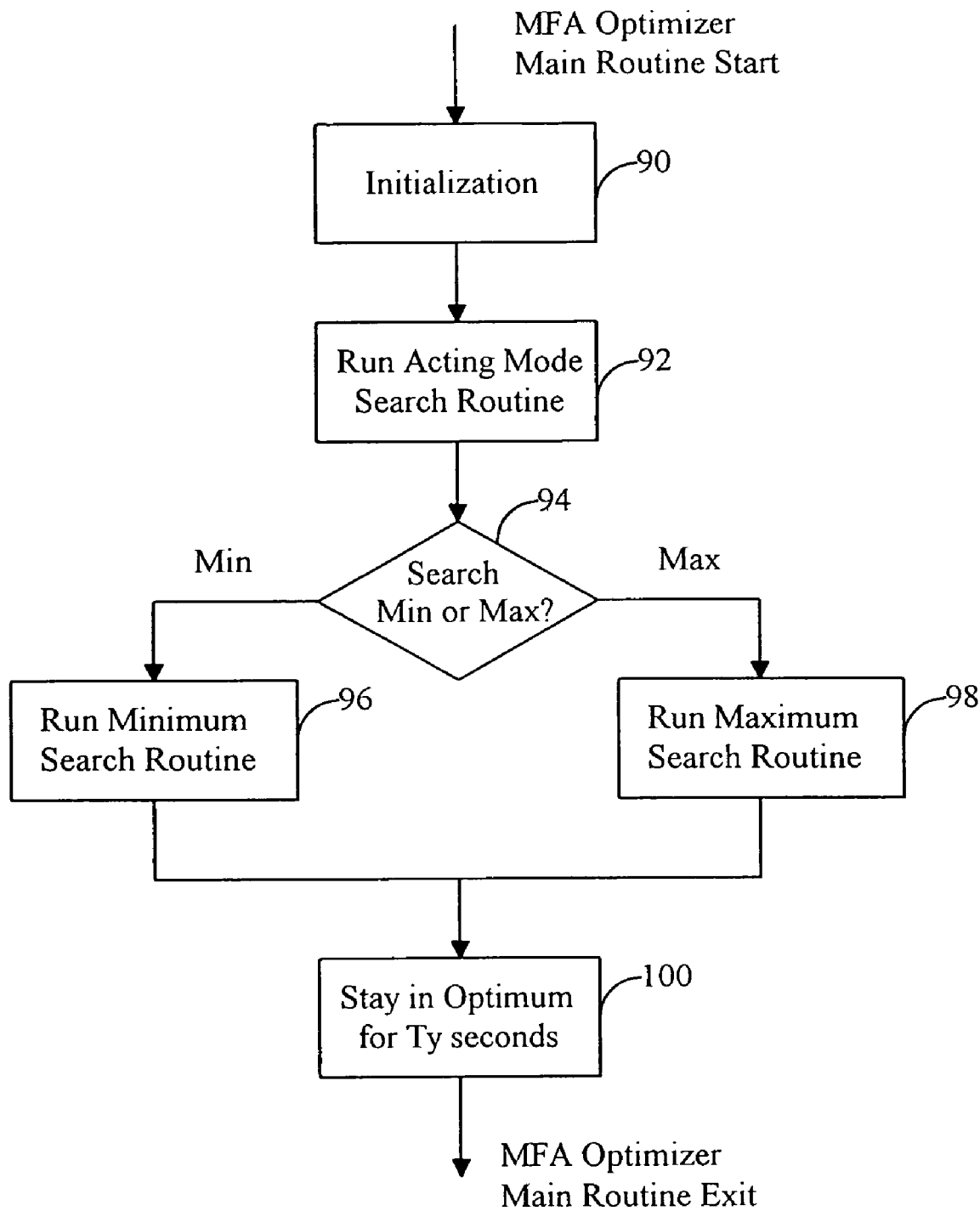
FIG. 6 is a flow chart describing the main search engine of an MFA optimizer.

FIG. 6 is a flow chart describing the main search engine of an MFA optimizer. At Block 90, initialization is taking place including the tasks to clear all counters, and set all default flags and parameters. At Block 92, the process acting mode search routine is run to determine if the process is running in a direct-acting mode or reverse-acting mode.

At Block 94, the routine checks to see if the optimizer is searching for a minimum or maximum based on the status set by the Min/Max Setter. If searching for a minimum, the routine goes to Block 96 to run the Minimum Search routine. If it is searching for a maximum, the routine goes to Block 98 to run the Maximum Search routine. Once an optimal point is reached, the routine moves to Block 100, where the user has the option of leaving the process running for a period of time, which can be set by the parameter Ty.

During this quiet period, the MFA optimizer is in an idle mode with a fixed output u(t), leaving the process running at the optimal operating condition. This waiting period should be determined by the user. If the process is fast and dynamic, Ty may be set to a small value or even at zero seconds so that the search continues. If the process is relatively slow and steady, Ty can be set for a couple of hours or even days. The rule of thumb here is that the process should be running at its optimal operating condition as long as possible to maximize the economical benefits.

There are several ways to design the MFA optimizer for generating its output u(t). Without losing generality, three design examples are provided.

1. MFA Controller-Based MFA Optimizer

The SISO Model-Free Adaptive (MFA) controllers described in U.S. Pat. Nos. 6,055,524 and 6,556,980 B1 can be used to compute the MFA optimizer. When using this approach, the MFA optimizer can adapt to fit the changing process dynamics and/or operating conditions. The MFA optimizer produces its output u(t) in a similar way to a SISO MFA controller with varying value of u(t). In general, the output velocity limit (OVL) is used to clamp the output to keep it from making too big of a jump at each sample interval. That means, at each sample interval, the calculated Δu(t) is limited by the output velocity limit as described in the following formulas:

$$\Delta u(t) = \Delta u(t), \text{ if } |\Delta u(t)| \leq OVL \quad (1a)$$

$$\Delta u(t) = SGN(\Delta u(t))OVL, \text{ if } |\Delta u(t)| > OVL \quad (1b)$$

where SGN(.) denotes the sign function, SGN(Δu(t)) extracts the sign of Δu(t), and OVL>0 is the output velocity limit, which is user configurable.

2. PI Controller-Based MFA Optimizer

A PI (proportional-integral) controller can be used to compute the output u(t). Since the derivative function of a PID controller will make the u(t) jump up and down, it cannot be used here. The standard PI algorithm has the following form:

$$u(t) = K_p \left[ e(t) + \frac{1}{T_i} \int e(t) dt \right], \quad (2)$$

where $K_p$ is the Proportional Gain, and $T_i$ is the Integral Time in second/repeat. Since we require a Δu(t), the following digital PI formula can be used.

$$\Delta u = K_p \{(e[2] - e[1]) + (T_s/T_i)e[2]\} \quad (3)$$

where Ts is the sample interval, e[1] and e[2] are the time sampled error signals of e(t), e[2] is the current sample of e(t). Similarly, the output velocity limit is used to clamp the output to keep it from making too big of a jump at each sample interval.

3. Output Step Limit Based MFA Optimizer

A simple design for the MFA optimizer is to allow the user to configure an Output Step Limit (OSL). This is equivalent to the Output Velocity Limit (OVL) used in the feedback controller cases. Since the direction that u(t) is moving is already known by the search engines, we can simple let $$\Delta u(t) = OSL, \quad (4)$$

where OSL>0 is the user entered output step limit. That means, at each sample interval, u(t) will move up or down by Δu(t) which has the fixed value of OSL.

The concept of the single-input-single-output (SISO) MFA optimizer can be expanded to multi-input-multi-output (MIMO) cases, which will be described in a future patent.

The invention claimed is:

1. An apparatus for automatically searching for the optimal operating point of a process, comprising:
   (a) a process having one variable input, a measured process variable which is a function of the output of said process, and a relationship between said input and said output that includes an optimal operating point at which said process transitions from a direct-acting to a reverse-acting mode or vice versa, said process selected from the group of processes consisting of;
      (i) a metal production process in which said variable input is the temperature of the metal oven or furnace and said measured process variable is a metallic property;
      (ii) a coal gasification process in which said variable input is the vapor to coal ratio and said measured process variable is the measurement of trace elements within coal;
      (iii) an ore mining process in which said variable input is the ore to water ratio and said measured process variable is the ore yield;
      (iv) a liquid pumping process in which said variable input is the speed of variable frequency drives (VFD) and said measured process variable is the ratio of total power consumption to liquid flow rate:
   (b) a minimum or maximum setter providing a source of setpoint signals; and
   (c) an optimizer connected to said setpoint signal source and said process variable, said optimizer being arranged to so vary said input as to cause said process variable to reach said optimal operating point and stay near thereto for optimizing the efficiency of said process, said optimizer including:
      (i) an acting mode search engine arranged to detect the direct-acting or reverse-acting mode of said process; and
      (ii) a maximum search engine arranged to detect if said process variable has reached a maximum value, and/or a minimum search engine arranged to detect if the said process variable has reached a minimum value.

2. The apparatus of claim 1, in which said process is controlled by a control output of a single-input-single-output model-free adaptive controller as part of the said optimizer, said control output being applied to the input of said process, said controller including:
(a) an error input representative of the difference between said measured process variable and a predetermined setpoint;
(b) a model-free adaptive controller producing a control output u(t);
(c) the output of said optimizer being in the form $$\Delta u(t) = \Delta u(t), \text{ if } |\Delta u(t)| \leq OVL$$

$$\Delta u(t) = SGN(\Delta u(t))OVL, \text{ if } |\Delta u(t)| > OVL$$

or an equivalent thereof, in which $\Delta u(t)$ is an increment or decrement of the optimizer output, SGN(.) denotes the sign function, SGN($\Delta u(t)$) extracts the sign of $\Delta u(t)$, and OVL>0 is a user-selected output velocity limit.

3. The apparatus of claim 1, in which said process is controlled by the control output of a single-input-single-output proportional-integral controller as part of the said optimizer, said control output being applied to the input of said process, said controller including:
(a) an error input e(t) representative of the difference between said measured process variable and a predetermined setpoint;
(b) the output of said optimizer being in the form $$\Delta u = K_p \{(e[2]-e[1])+(T_s/T_i)e[2]\},$$

$$\Delta u(t) = SGN(\Delta u(t))OVL, \text{ if} |\Delta u(t)| > OVL$$

or an equivalent thereof, in which $\Delta u(t)$ is an increment or decrement of the optimizer output, Ts is the sample interval, $K_p$ is the proportional gain, Ti is the integral time, e[1] and e[2] are the time sampled error signals of e(t), e[2] is the current sample of e(t); SGN(.) denotes the sign function, SGN($\Delta u(t)$) extracts the sign of $\Delta u(t)$, and OVL>0 is a user-selected controller output velocity limit.

4. The apparatus of claim 1, in which said process is controlled by a controller as part of the said optimizer, which is subject to a user-selected output step limit OSL, the output of said optimizer being in the form $$\Delta u(t) = OSL,$$

or an equivalent thereof, in which $\Delta u(t)$ is an increment or decrement of the optimizer output, and OSL>0 is said user-selected output step limit.

5. A method of searching, through the use of an optimizer, for the optimal operating point of a process having one variable input, a measured process variable which is a function of the output of said process, and a relationship between said input and said output that includes an optimal operating point at which said process transitions from a direct-acting to a reverse-acting mode or vice versa, said process selected from the group of processes consisting of:
(i) a metal production process in which said variable input is the temperature of the metal oven or furnace and said measured process variable is a metallic property;
(ii) a coal gasification process in which said variable input is the vapor to coal ratio and said measured process variable is the measurement of trace elements within coal;
(iii) an ore mining process in which said variable input is the ore to water ratio and said measured process variable is the ore yield;
(iv) a liquid pumping process in which said variable input is the speed of variable frequency drives (VFD) and said measured process variable is the ratio of total power consumption to liquid flow rate;
(v) a combustion process in which said variable input is the air flow or fuel to air ratio and said measured process variable is the combustion temperature or generated energy;
(vi) a chemical reactor process in which said variable input is the ratio of two material inflows to the reactor and said measured process variable is the product outflow or yield;
(vii) an ore ball mill process in which said variable input is the ratio of ore to metal balls of the ball mill and said measured process variable is the crushed ore yield;
(viii) a wind turbine process in which said variable input is the generator speed of the wind turbine and said measured process variable is the generated power;
said method comprising the steps of;
(a) providing initialization steps;
(b) selecting a search for a maximum or a minimum operating point;
(c) running a process acting mode search engine routine to determine if the process is running in a direct-acting mode or reverse-acting mode;
(d) determining if the optimizer is searching for a minimum or maximum based on the selected search;
(e) running a minimum search engine routine if a minimum search has been selected;
(f) running a maximum search engine routine if a maximum search has been selected; and
(g) maintaining said operating point for a controllable period of time for optimizing the efficiency of said process.

6. The method of claim 5 in which said process acting mode search engine comprises a direct-acting counter, a reverse-acting counter, a direct-acting flag, and a reverse-acting flag; and the steps of:
(a) providing initialization steps including tasks to clear all counters, and set all default flags and parameters;
(b) increasing the output of said optimizer by a computed increment;
(c) waiting for a user-selected period of time;
(d) determining if the measured process variable has increased;
(e) if the measured process variable has increased, incrementing said direct-acting counter by 1, clearing said reverse-acting counter, and determining if the count of said direct-acting counter is bigger than a predetermined number;
(f) if the measured process variable has decreased, incrementing said reverse-acting counter by 1, clearing said direct-acting counter, and determining if the count of said reverse-acting counter is bigger than a predetermined number;
(g) if the count of said direct-acting counter is bigger than a predetermined number, setting said direct-acting flag to ON, and exiting the acting mode search engine routine;
(h) if the count of the direct-acting counter is not bigger than a predetermined number, going back to step b);
(i) if the count of said reverse-acting counter is bigger than a predetermined number, setting said reverse-acting flag to ON, and exiting said acting mode search engine routine; and
(j) if the count of said reverse-acting counter is not bigger than a predetermined number, going back to step b).

7. The method of claim 5 in which the maximum search engine comprises a direct-acting flag, a maximum counter, and a maximum flag; and the steps of:
   (a) providing initialization steps including tasks to clear all counters, and set all default flags and parameters;
   (b) determining if said process is direct-acting;
   (c) increasing the output of said optimizer by a computed increment if said process is direct-acting;
   (d) decreasing the output of said optimizer by a computed decrement if said process is not direct-acting;
   (e) waiting for a user-selected period of time;
   (f) determining if the measured process variable has increased;
   (g) if the measured process variable has increased, setting said maximum counter to 0 and going back to step b);
   (h) if the measured process variable has not increased, saving the current maximum value, and incrementing said maximum counter by 1;
   (i) determining if the count of the maximum counter is bigger than a predetermined number;
   (j) if the count of the maximum counter is not bigger than a predetermined number, going back to step b); and
   (k) if the count of the maximum counter is bigger than a predetermined number, setting said maximum flag to ON, saving the current value of optimizer output, and exiting the maximum search engine routine.

8. The method of claim 5 in which the minimum search engine comprises a direct-acting flag, a minimum counter, and a minimum flag; and the steps of:
   (a) providing initialization steps including tasks to clear all counters, and set all default flags and parameters;
   (b) determining if said process is direct-acting;
   (c) increasing the output of said optimizer by a computed increment if said process is direct-acting;
   (d) decreasing the output of said optimizer by a computed decrement if said process is not direct-acting;
   (e) waiting for a user-selected period of time;
   (f) determining if the measured process variable has decreased;
   (g) if the measured process variable has decreased, setting said minimum counter to 0 and going back to step b);
   (h) if the measured process variable has not decreased, saving the current minimum value, and incrementing said minimum counter by 1;
   (i) determining if the count of the minimum counter is bigger than a predetermined number;
   (j) if the count of the minimum counter is not bigger than a predetermined number, going back to step b); and
   (k) if the count of the minimum counter is bigger than a predetermined number, setting said minimum flag to ON, saving the current value of optimizer output, and exiting the minimum search engine routine.

9. The method of claim 5, which the said controllable period of time is 0.

10. The method of claims 6, 7, or 8, in which the said user-selected period of time is the process delay time between its input and output.

11. The method of claims 6, 7 or 8, in which the said predetermined number is 2.

12. The apparatus of claim 1, in which the said minimum or maximum setter produces:
   (a) a setpoint value equivalent to the high limit of the said output, if the optimizer is to search for a maximum; or
   (b) a setpoint value equivalent to the low limit of the said output, if the optimizer is to search for a minimum.

13. The apparatus of claim 1, in which the signal of the measured process variable is filtered by a filter mechanism to remove noises.

14. The apparatus of claim 1 in which said optimizer is a computer program embodied in a digital medium.

15. One or more processor readable storage devices having processor readable code embodied on said processor readable storage devices, said processor readable code for programming one or more processors to perform a method of searching, through the use of an optimizer, for the optimal operating point of a process having one variable input, a measured process variable which is a function of the output of said process, and a relationship between said input and said output that includes an optimal operating point at which said process transitions from a direct-acting to a reverse-acting mode or vice versa, said process selected from the group of processes consisting of:
   (i) a metal production process in which said variable input is the temperature of the metal oven or furnace and said measured process variable is a metallic property;
   (ii) a coal gasification process in which said variable input is the vapor to coal ratio and said measured process variable is the measurement of trace elements within coal;
   (iii) an ore mining process in which said variable input is the ore to water ratio and said measured process variable is the ore yield;
   (iv) a liquid pumping process in which said variable input is the speed of variable frequency drives (VFD) and said measured process variable is the ratio of total power consumption to liquid flow rate;
   (v) a combustion process in which said variable input is the air flow or fuel to air ratio and said measured process variable is the combustion temperature or generated energy;
   (vi) a chemical reactor process in which said variable input is the ratio of two material inflows to the reactor and said measured process variable is the product outflow or yield;
   (vii) an ore ball mill process in which said variable input is the ratio of ore to metal balls of the ball mill and said measured process variable is the crushed ore yield;
   (viii) a wind turbine process in which said variable input is the generator speed of the wind turbine and said measured process variable is the generated power;
said method comprising the steps of:
   (a) providing initialization steps;
   (b) selecting a search for a maximum or a minimum operating point;
   (c) running a process acting mode search engine routine to determine if the process is running in a direct-acting mode or reverse-acting mode;
   (d) determining if the optimizer is searching for a minimum or maximum based on the selected search;
   (e) running a minimum search engine routine if a minimum search has been selected;
   (f) running a maximum search engine routine if a maximum search has been selected; and
   (g) maintaining said operating point for a controllable period of time for optimizing the efficiency of said process.

16. The one or more processor readable storage devices of claim 15 in which said process acting mode search engine comprises a direct-acting counter, a reverse-acting counter, a direct-acting flag, and a reverse-acting flag; and the steps of:
   (a) providing initialization steps including tasks to clear all counters, and set all default flags and parameters;

(b) increasing the output of said optimizer by a computed increment;
(c) waiting for a user-selected period of time;
(d) determining if the measured process variable has increased;
(e) if the measured process variable has increased, incrementing said direct-acting counter by 1, clearing said reverse-acting counter, and determining if the count of said direct-acting counter is bigger than a predetermined number;
(f) if the measured process variable has decreased, incrementing said reverse-acting counter by 1, clearing said direct-acting counter, and determining if the count of said reverse-acting counter is bigger than a predetermined number;
(g) if the count of said direct-acting counter is bigger than a predetermined number, setting said direct-acting flag to ON, and exiting the acting mode search engine routine;
(h) if the count of the direct-acting counter is not bigger than a predetermined number, going back to step (b);
(i) if the count of said reverse-acting counter is bigger than a predetermined number, setting said reverse-acting flag to ON, and exiting said acting mode search engine routine; and
(j) if the count of said reverse-acting counter is not bigger than a predetermined number, going back to step (b).

17. The one or more processor readable storage devices of claim 15 in which the maximum search engine comprises a direct-acting flag, a maximum counter, and a maximum flag; and the steps of:
(a) providing initialization steps including tasks to clear all counters, and set all default flags and parameters;
(b) determining if said process is direct-acting;
(c) increasing the output of said optimizer by a computed increment if said process is direct-acting;
(d) decreasing the output of said optimizer by a computed decrement if said process is not direct-acting;
(e) waiting for a user-selected period of time;
(f) determining if the measured process variable has increased;
(g) if the measured process variable has increased, setting said maximum counter to 0 and going back to step (b);
(h) if the measured process variable has not increased, saving the current maximum value, and incrementing said maximum counter by 1;
(i) determining if the count of the maximum counter is bigger than a predetermined number;
(j) if the count of the maximum counter is not bigger than a predetermined number, going back to step (b); and
(k) if the count of the maximum counter is bigger than a predetermined number, setting said maximum flag to ON, saving the current value of optimizer output, and exiting the maximum search engine routine.

18. The one or more processor readable storage devices of claim 15 in which the minimum search engine comprises a direct-acting flag, a minimum counter, and a minimum flag; and the steps of:
(a) providing initialization steps including tasks to clear all counters, and set all default flags and parameters;
(b) determining if said process is direct-acting;
(c) increasing the output of said optimizer by a computed increment if said process is direct-acting;
(d) decreasing the output of said optimizer by a computed decrement if said process is not direct-acting;
(e) waiting for a user-selected period of time;
(f) determining if the measured process variable has decreased;
(g) if the measured process variable has decreased, setting said minimum counter to 0 and going back to step (b);
(h) if the measured process variable has not decreased, saving the current minimum value, and incrementing said minimum counter by 1;
(i) determining if the count of the minimum counter is bigger than a predetermined number;
(j) if the count of the minimum counter is not bigger than a predetermined number, going back to step (b); and
(k) if the count of the minimum counter is bigger than a predetermined number, setting said minimum flag to ON, saving the current value of optimizer output, and exiting the minimum search engine routine.

19. The one or more processor readable storage devices of claim 15, in which the said controllable period of time is 0.

20. The one or more processor readable storage devices of claims 16, 17, or 18, in which the said user-selected period of time is the process delay time between its input and output.

21. The one or more processor readable storage devices of claims 16, 17 or 18, in which the said predetermined number is 2.

22. An apparatus for automatically searching for the optimal operating point of a combustion process, comprising:
(a) a combustion process having one variable input, a measured process variable which is a function of the output of said process, and a relationship between said input and said output that includes an optimal operating point at which said combustion process transitions from a direct-acting to a reverse-acting mode or vice versa; in which said variable input is the air flow or fuel to air ratio and said measured process variable is the combustion temperature or generated energy;
(b) a minimum or maximum setter providing a source of setpoint signals; and
(c) an optimizer connected to said setpoint signal source and said process variable, said optimizer being arranged to so vary said input as to cause said process variable to reach said optimal operating point and stay near thereto for optimizing the efficiency of said combustion process, said optimizer including:
  (i) an acting mode search engine arranged to detect the direct-acting or reverse-acting mode of said combustion process; and
  (ii) a maximum search engine arranged to detect if said process variable has reached a maximum value, and/or a minimum search engine arranged to detect if the said process variable has reached a minimum value.

23. The apparatus of claim 22, in which said combustion process is controlled by a control output of a single-input-single-output model-free adaptive controller as part of the said optimizer, said control output being applied to the input of said combustion process, said controller including:
(a) an error input representative of the difference between said measured process variable and a predetermined setpoint;
(b) a model-free adaptive controller producing a control output u(t);
(c) the output of said optimizer being in the form $\Delta u(t) = \Delta u(t)$, if $|\Delta u(t)| \leq OVL$ $\Delta u(t) = SGN(\Delta u(t))OVL$, if $|\Delta u(t)| > OVL$ or an equivalent thereof, in which $\Delta u(t)$ is an increment or decrement of the optimizer output, SGN(.) denotes the sign function, SGN(Δu(t)) extracts the sign of Δu(t), and OVL>0 is a user-selected output velocity limit.

24. The apparatus of claim 22, in which said combustion process is controlled by the control output of a single-input-single-output proportional-integral controller as part of the said optimizer, said control output being applied to the input of said combustion process, said controller including:
    (a) an error input e(t) representative of the difference between said measured process variable and a predetermined setpoint;
    (b) the output of said optimizer being in the form $$\Delta u = K_p\{(e[2]-e[1])+(T_s/T_i)e[2]\},$$

$$\Delta u(t)=\text{SGN}(\Delta u(t))\text{OVL}, \text{ if } |\Delta u(t)|>\text{OVL}$$

or an equivalent thereof, in which Δu(t) is an increment or decrement of the optimizer output, Ts is the sample interval, Kp is the proportional gain, Ti is the integral time, e[1] and e[2] are the time sampled error signals of e(t), e[2] is the current sample of e(t); SGN(.) denotes the sign function, SGN(Δu(t)) extracts the sign of Δu(t), and OVL>0 is a user-selected controller output velocity limit.

25. The apparatus of claim 22, in which said combustion process is controlled by a controller as part of the said optimizer, which is subject to a user-selected output step limit OSL, the output of said optimizer being in the form $$\Delta u(t)=\text{OSL},$$

or an equivalent thereof, in which Δu(t) is an increment or decrement of the optimizer output, and OSL>0 is said user-selected output step limit.

26. An apparatus for automatically searching for the optimal operating point of a chemical reactor process, comprising:
    (a) a chemical reactor process having one variable input, a measured process variable which is a function of the output of said process, and a relationship between said input and said output that includes an optimal operating point at which said chemical reactor process transitions from a direct-acting to a reverse-acting mode or vice versa; in which said variable input is the ratio of two material inflows to the reactor and said measured process variable is the product outflow or yield;
    (b) a minimum or maximum setter providing a source of setpoint signals; and
    (c) an optimizer connected to said setpoint signal source and said process variable, said optimizer being arranged to so vary said input as to cause said process variable to reach said optimal operating point and stay near thereto for optimizing the efficiency of said chemical reactor process, said optimizer including:
        (i) an acting mode search engine arranged to detect the direct-acting or reverse-acting mode of said chemical reactor process; and
        (ii) a maximum search engine arranged to detect if said process variable has reached a maximum value, and/or a minimum search engine arranged to detect if the said process variable has reached a minimum value.

27. The apparatus of claim 26, in which said chemical reactor process is controlled by a control output of a single-input-single-output model-free adaptive controller as part of the said optimizer, said control output being applied to the input of said chemical reactor process, said controller including:
    (a) an error input representative of the difference between said measured process variable and a predetermined setpoint;
    (b) a model-free adaptive controller producing a control output u(t);
    (c) the output of said optimizer being in the form $$\Delta u(t)=\Delta u(t), \text{ if } |\Delta u(t)|\leq \text{OVL}$$

$$\Delta u(t)=\text{SGN}(\Delta u(t))\text{OVL}, \text{ if } |\Delta u(t)|>\text{OVL}$$

or an equivalent thereof, in which Δu(t) is an increment or decrement of the optimizer output, SGN(.) denotes the sign function, SGN(Δu(t)) extracts the sign of Δu(t), and OVL>0 is a user-selected output velocity limit.

28. The apparatus of claim 26, in which said chemical reactor process is controlled by the control output of a single-input-single-output proportional-integral controller as part of the said optimizer, said control output being applied to the input of said chemical reactor process, said controller including:
    (a) an error input e(t) representative of the difference between said measured process variable and a predetermined setpoint;
    (b) the output of said optimizer being in the form $$\Delta u = K_p\{(e[2]-e[1])+(T_s/T_i)e[2]\},$$

$$\Delta u(t)=\text{SGN}(\Delta u(t))\text{OVL}, \text{ if } |\Delta u(t)|>\text{OVL}$$

or an equivalent thereof, in which Δu(t) is an increment or decrement of the optimizer output, Ts is the sample interval, Kp is the proportional gain, Ti is the integral time, e[1] and e[2] are the time sampled error signals of e(t), e[2] is the current sample of e(t); SGN(.) denotes the sign function, SGN(Δu(t)) extracts the sign of Δu(t), and OVL>0 is a user-selected controller output velocity limit.

29. The apparatus of claim 26, in which said chemical reactor process is controlled by a controller as part of the said optimizer, which is subject to a user-selected output step limit OSL, the output of said optimizer being in the form $$\Delta u(t)=\text{OSL},$$

or an equivalent thereof, in which Δu(t) is an increment or decrement of the optimizer output, and OSL>0 is said user-selected output step limit.

30. An apparatus for automatically searching for the optimal operating point of an ore ball mill process, comprising:
    (a) an ore ball mill process having one variable input, a measured process variable which is a function of the output of said process, and a relationship between said input and said output that includes an optimal operating point at which said ore ball mill process transitions from a direct-acting to a reverse-acting mode or vice versa; in which said variable input is the ratio of ore to metal balls of the ball mill and said measured process variable is the crushed ore yield;
    (b) a minimum or maximum setter providing a source of setpoint signals; and
    (c) an optimizer connected to said setpoint signal source and said process variable, said optimizer being arranged to so vary said input as to cause said process variable to reach said optimal operating point and stay near thereto for optimizing the efficiency of said ore ball mill process, said optimizer including:
        (i) an acting mode search engine arranged to detect the direct-acting or reverse-acting mode of said ore ball mill process; and
        (ii) a maximum search engine arranged to detect if said process variable has reached a maximum value, and/or a minimum search engine arranged to detect if the said process variable has reached a minimum value.

31. The apparatus of claim 30, in which said ore ball mill process is controlled by a control output of a single-input-single-output model-free adaptive controller as part of the said optimizer, said control output being applied to the input of said ore ball mill process, said controller including:
  (a) an error input representative of the difference between said measured process variable and a predetermined setpoint;
  (b) a model-free adaptive controller producing a control output u(t);
  (c) the output of said optimizer being in the form $\Delta u(t) = \Delta u(t)$, if $|\Delta u(t)| \leq OVL$ $\Delta u(t) = SGN(\Delta u(t))OVL$, if $|\Delta u(t)| > OVL$ or an equivalent thereof, in which $\Delta u(t)$ is an increment or decrement of the optimizer output, SGN(.) denotes the sign function, SGN($\Delta u(t)$) extracts the sign of $\Delta u(t)$, and OVL>0 is a user-selected output velocity limit.

32. The apparatus of claim 30, in which said ore ball mill process is controlled by the control output of a single-input-single-output proportional-integral controller as part of the said optimizer, said control output being applied to the input of said ore ball mill process, said controller including:
  (a) an error input e(t) representative of the difference between said measured process variable and a predetermined setpoint;
  (b) the output of said optimizer being in the form $\Delta u = K_p\{(e[2] - e[1]) + (T_s/T_i)e[2]\}$, $\Delta u(t) = SGN(\Delta u(t))OVL$, if $|\Delta u(t)| > OVL$ or an equivalent thereof, in which $\Delta u(t)$ is an increment or decrement of the optimizer output, Ts is the sample interval, Kp is the proportional gain, Ti is the integral time, e[1] and e[2] are the time sampled error signals of e(t), e[2] is the current sample of e(t); SGN(.) denotes the sign function, SGN($\Delta u(t)$) extracts the sign of $\Delta u(t)$, and OVL>0 is a user-selected controller output velocity limit.

33. The apparatus of claim 30, in which said ore ball mill process is controlled by a controller as part of the said optimizer, which is subject to a user-selected output step limit OSL, the output of said optimizer being in the form $\Delta u(t) = OSL$, or an equivalent thereof, in which $\Delta u(t)$ is an increment or decrement of the optimizer output, and OSL>0 is said user-selected output step limit.

34. An apparatus for automatically searching for the optimal operating point of a wind turbine process, comprising:
  (a) a wind turbine process having one variable input, a measured process variable which is a function of the output of said process, and a relationship between said input and said output that includes an optimal operating point at which said wind turbine process transitions from a direct-acting to a reverse-acting mode or vice versa; in which said variable input is the generator speed of the wind turbine and said measured process variable is the generated power;
  (b) a minimum or maximum setter providing a source of setpoint signals; and
  (c) an optimizer connected to said setpoint signal source and said process variable, said optimizer being arranged to so vary said input as to cause said process variable to reach said optimal operating point and stay near thereto for optimizing the efficiency of said wind turbine process, said optimizer including:
    (i) an acting mode search engine arranged to detect the direct-acting or reverse-acting mode of said wind turbine process; and
    (ii) a maximum search engine arranged to detect if said process variable has reached a maximum value, and/or a minimum search engine arranged to detect if the said process variable has reached a minimum value.

35. The apparatus of claim 34, in which said wind turbine process is controlled by a control output of a single-input-single-output model-free adaptive controller as part of the said optimizer, said control output being applied to the input of said wind turbine process, said controller including:
  (a) an error input representative of the difference between said measured process variable and a predetermined setpoint;
  (b) a model-free adaptive controller producing a control output u(t);
  (c) the output of said optimizer being in the form $\Delta u(t) = \Delta u(t)$, if $|\Delta u(t)| \leq OVL$ $\Delta u(t) = SGN(\Delta u(t))OVL$, if $|\Delta u(t)| > OVL$ or an equivalent thereof, in which $\Delta u(t)$ is an increment or decrement of the optimizer output, SGN(.) denotes the sign function, SGN($\Delta u(t)$) extracts the sign of $\Delta u(t)$, and OVL>0 is a user-selected output velocity limit.

36. The apparatus of claim 34, in which said wind turbine process is controlled by the control output of a single-input-single-output proportional-integral controller as part of the said optimizer, said control output being applied to the input of said wind turbine process, said controller including:
  (a) an error input e(t) representative of the difference between said measured process variable and a predetermined setpoint;
  (b) the output of said optimizer being in the form $\Delta u = K_p\{(e[2]/e[1]) + (T_s/T_i)e[2]\}$, $\Delta u(t) = SGN(\Delta u(t))OVL$, if $|\Delta u(t)| > OVL$ or an equivalent thereof, in which $\Delta u(t)$ is an increment or decrement of the optimizer output, Ts is the sample interval, Kp is the proportional gain, Ti is the integral time, e[1] and e[2] are the time sampled error signals of e(t), e[2] is the current sample of e(t); SGN(.) denotes the sign function, SGN($\Delta u(t)$) extracts the sign of $\Delta u(t)$, and OVL>0 is a user-selected controller output velocity limit.

37. The apparatus of claim 34, in which said wind turbine process is controlled by a controller as part of the said optimizer, which is subject to a user-selected output step limit OSL, the output of said optimizer being in the form $\Delta u(t) = OSL$, or an equivalent thereof, in which $\Delta u(t)$ is an increment or decrement of the optimizer output, and OSL>0 is said user-selected output step limit. or an equivalent thereof, in which Au(t) is an increment or decrement of the optimizer output, SGN(.) denotes the sign function, SGN(Au(t)) extracts the sign of Au(t), and OVL>0 is a user-selected output velocity limit.

* * * * *